Patented Oct. 18, 1927.

1,646,290

UNITED STATES PATENT OFFICE.

RICHARD HERZ AND FRITZ SCHULTE, OF FRANKFORT-ON-THE-MAIN, GERMANY, ASSIGNORS TO GRASSELLI DYESTUFF CORPORATION, OF NEW YORK, N. Y., A CORPORATION OF DELAWARE.

PROCESS FOR MANUFACTURING 1-AMINONAPHTHALENE-8-CARBOXYLIC ACID.

No Drawing. Application filed July 12, 1926, Serial No. 122,030, and in Germany November 29, 1924.

We have found a new and original process for manufacturing the 1-aminonaphthalene-8-carboxylic acid in a pure state with an almost quantitative yield and at comparatively low costs. Hitherto this acid could not be produced on a technical scale.

Our new process consists in allowing an alkaline acting agent to react at elevated temperatures on 8-cyannaphthalene-1-sulfonic acid.

The chemical reaction which takes place runs probably as follows:

In the first phase of the reaction probably the cyanogen group is saponified to the carboxyamidogroup; the resulting intermediate product, namely the 8-naphthamide-1-sulfonic acid, can be isolated when carrying out the reaction. Then, in the second phase, the sulfogroup is split off and a ring is formed, namely the inner anhydride of the 1-aminonaphthalene-8-carboxylic acid, known in the literature as naphthostyril. This latter compound is easily saponified by the action of dilute alkalies to the 1-aminonaphthalene-8-carboxylic acid.

The following formulæ illustrate the course of the reactions:

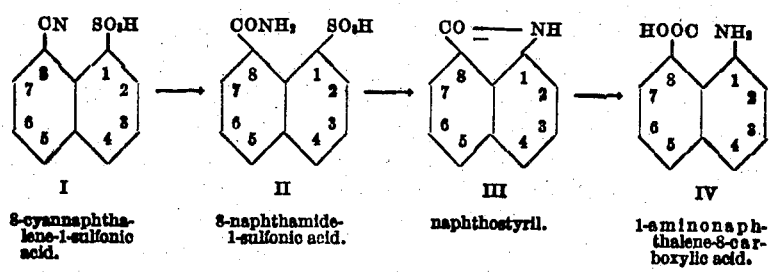

I
8-cyannaphtha-
lene-1-sulfonic
acid.

II
8-naphthamide-
1-sulfonic acid.

III
naphthostyril.

IV
1-aminonaph-
thalene-8-car-
boxylic acid.

In carrying out our process practically, caustic alkalies in aqueous or alcoholic solution or alkaline earth metal compounds, preferably milk of lime, may be used either at ordinary pressure or in a closed vessel at elevated pressure.

The starting material for the process, 8-cyannaphthalene-1-sulfonic acid, is easily obtainable in the usual manner by converting 8-aminonaphthalene-1-sulfonic acid to its corresponding diazo-compound and treating the latter with cuprous cyanide according to the Sandmeyer reaction. It forms a difficultly soluble sodium salt which may be isolated from its solutions by the addition thereto of common salt or by an equivalent procedure. The free 8-cyannaphthalene-1-sulfonic acid may be obtained by converting the sodium salt into the difficultly soluble lead salt and setting the acid free in the usual manner; for instance, by precipitating the lead with the corresponding amount of sulfuric acid or hydrogen sulfide. The 8-cyannaphthalene-1-sulfonic acid is very easily soluble in water and shows a strong acid reaction.

The new process may be illustrated by the following examples, the parts being by weight and all temperatures in centigrade degrees:

Example 1.—40 parts of caustic potash and 5 parts of water are heated in a suitable vessel until the mass is dissolved. Then 10 parts of the sodium salt of the 8-cyannaphthalene-1-sulfonic acid are introduced at about 150°. The vessel is closed and then heating is continued under reflux. The temperature is slowly increased while stirring well to about 180–200°. Higher temperatures preferably are avoided, as at higher temperatures ammonia is split off and undesirable by-products are formed.

When the reaction is finished, the product of reaction thus obtained consists almost entirely of the potassium salt of the naphthostyril, which may be isolated directly by diluting the mass with common salt solution and filtering the separated potassium salt. From this salt the free naphthostyril is easily obtained by acidifying. It is thus obtained in an almost pure state; when recrystallized from alcohol or glacial acetic acid it shows a melting point of 180–181° and it is identical in all its properties with the product, described by Eckstrand (see Journal für prakt. Chemie (2), 38 (1888) page 160).

If, however, it is desired to produce the 1-aminonaphthalene-8-carboxylic acid, the fusion mass is diluted with water and then digested at about 90–100° for some hours, until the naphthostyril is fully saponified. Then it is allowed to cool down and carefully acidified, while stirring and cooling; the difficultly soluble 1-aminonaphthalene-8-carboxylic acid is isolated by filtration in a pure state with an almost quantitative yield. It is identical with the acid described by Eckstrand (l. c.) The aforesaid intermediate product of the process, namely the 8-naphthamide-1-sulfonic acid, can be isolated by interrupting the melt after about an hour and diluting the mass with water, until a concentrated alkaline solution is obtained. The potassium salt of the 8-naphthamide-1-sulfonic acid separates, because it is difficultly soluble in such a solution. It crystallizes from water in rhombic leaflets.

This intermediate product may also advantageously be produced by heating the 8-cyannaphthalene-1-sulfonic acid in the form of a suitable salt with a caustic soda solution of for instance 30–40° Bé. for some time at 100–120°, with or without the addition of alcohol. The sodium salt of the thus produced 8-naphthamide-1-sulfonic acid crystallizes, when cooled down, in rhombic leaflets.

By melting the 8-naphthamide-1-sulfonic acid with concentrated caustic alkalies or even with alkaline acting agents, for instance, with sodium formate or sodium acetate, at higher temperatures, it is converted into naphthostyril.

But if the 8-naphthamide-1-sulfonic acid is saponified with dilute acids, ammonia is split off and the 8-carboxynaphthalene-1-sulfonic acid is formed.

*Example 2.*—4 parts of caustic potash and 6 parts of methylic alcohol are heated for some time at 80–100°; at this temperature one part of the sodium salt of the 8-cyan-naphthalene-1-sulfonic acid is introduced. Then methyl alcohol is slowly distilled off, until the temperature reaches 130–150°. At this temperature heating is continued for some hours under reflux.

The product of reaction, thus obtained, consists almost entirely in the form of the inner anhydride of 1-aminonaphthalene-8-carboxylic acid. It may be isolated as such, or it may be converted into the acid itself in the manner described above in Example 1.

*Example 3.*—In an autoclave 10 parts of the sodium salt of the 8-cyannaphthalene-1-sulfonic acid are introduced at ordinary temperatures into 40 parts of caustic soda solution of 40° Bé. Then the mass is heated for 6–10 hours at 150–200°, corresponding to a pressure of 10–15 atmospheres. The product of reaction thus obtained is the difficultly soluble sodium salt of 1-aminonaphthalene-8-carboxylic acid. After cooling down, the mass is diluted with common salt solution and the sodium salt of the carboxylic acid is isolated by filtration. It may be purified by recrystallizing it from a diluted common salt solution, or the free acid may be obtained by acidifying. It is identical with the acid described above.

*Example 4.*—1 part of the sodium salt,—or of any suitable salt,—of 8-cyannaphthalene-1-sulfonic acid is heated with 15 parts of milk of lime of 25° Bé. for some hours at 200–250° in an autoclave, while stirring. The 1-aminonaphthalene-8-carboxylic acid, thus formed, remains in solution in the form of its easily soluble calcium-salt. The mass is diluted with water, filtered off, and the free acid is isolated from the filtrate by acidifying it.

We wish it to be understood, that when working in an autoclave the pressure corresponds functionally to the tension of the reacting agent and the temperature applied. This application contains subject matter described and claimed in our co-pending application Serial No. 190,127, filed May 9, 1927.

We claim:

1. Process for the manufacture of a 1-amino-naphthalene-8-carboxylic acid compound which comprises treating an 8-cyannaphthalene-1-sulfonic acid compound with an alkaline-acting agent at a temperature greater than 100° C. and not substantially above 200° C.

2. Process for the manufacture of a 1-amino-naphthalene-8-carboxylic acid compound which comprises treating a salt of 8-cyannaphthalene-1-sulfonic acid with an alkaline-acting agent at a temperature greater than 100° C. and not substantially above 200° C.

3. Process for the manufacture of a 1-amino-naphthalene-8-carboxylic acid compound which comprises treating a salt of 8-cyannaphthalene-1-sulfonic acid with an alkaline acting agent in an autoclave at a temperature greater than 100° C. and not substantially greater than above about 200° C.

4. Process for the manufacture of a 1-amino-naphthalene-8-carboxylic acid compound which comprises treating a salt of 8-cyannaphthalene-1-sulfonic acid with a caustic alkali at a temperature greater than 100° C. and not substantially above 200° C.

5. Process for the manufacture of a 1-amino-naphthalene-8-carboxylic acid compound which comprises treating a salt of 8-cyannaphthalene-1-sulfonic acid with a caustic alkali in an autoclave at a temperature greater than 100° C. and not substantially greater than above about 200° C.

6. Process for the manufacture of 1-aminonaphthalene-8-carboxylic acid which comprises reacting on a salt of 8-cyannaphthalene-1-sulfonic acid with a caustic alkali at a temperature greater than 100° C. and not substantially above 200° C. and isolating the resulting 1-aminonaphthalene-8-carboxylic acid by carefully acidifying the reaction mixture.

7. In a new process for the manufacture of a 1-aminonaphthalene-8-carboxylic acid compound which involves reacting with a caustic alkali at a temperature greater than 100° C. and not substantially above 200° C. on a salt of 8-cyannaphthalene-1-sulfonic acid, the step which consists in isolating the 1-amino-naphthalene-8-carboxylic acid compound in the form of its inner anhydride.

8. Process for the manufacture of a 1-amino-naphthalene-8-carboxylic acid compound which comprises treating a salt of 8-cyannaphthalene-1-sulfonic acid with a caustic alkali at a temperature greater than 100° C. and not substantially above 200° C., and isolating from the resulting reaction mixture a 1-amino-naphthalene-8-carboxylic acid compound.

9. Process for the manufacture of a 1-amino-naphthalene-8-carboxylic acid compound which comprises treating an 8-cyan-naphthalene-1-sulfonic acid compound in alcoholic solution with an alkaline-acting agent at a temperature above 100° C. and not substantially above about 150° C.

In testimony whereof, we affix our signatures.

RICHARD HERZ.
FRITZ SCHULTE.